(12) United States Patent
Panga et al.

(10) Patent No.: US 9,080,440 B2
(45) Date of Patent: Jul. 14, 2015

(54) PROPPANT PILLAR PLACEMENT IN A FRACTURE WITH HIGH SOLID CONTENT FLUID

(75) Inventors: Mohan K. R. Panga, Novosibirsk (RU); Yiyan Chen, Sugar Land, TX (US); Moin Muhammad, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 441 days.

(21) Appl. No.: 13/073,458

(22) Filed: Mar. 28, 2011

(65) Prior Publication Data

US 2012/0247764 A1 Oct. 4, 2012
US 2014/0131040 A9 May 15, 2014

Related U.S. Application Data

(63) Continuation-in-part of application No. 12/827,434, filed on Jun. 30, 2010, now Pat. No. 8,490,698, which is a continuation-in-part of application No. 12/816,473, filed on Jun. 16, 2010, now Pat. No.
(Continued)

(51) Int. Cl.
*E21B 43/267* (2006.01)
*E21B 43/16* (2006.01)
*C09K 8/70* (2006.01)
*C09K 8/80* (2006.01)

(52) U.S. Cl.
CPC .............. *E21B 43/267* (2013.01); *C09K 8/70* (2013.01); *C09K 8/80* (2013.01); *E21B 43/164* (2013.01); *C09K 2208/08* (2013.01)

(58) Field of Classification Search
None
See application file for complete search history.

(56) References Cited

U.S. PATENT DOCUMENTS

| 2,193,775 A | 3/1940 | Stratford |
| 2,513,944 A | 7/1950 | Kessler |
| RE24,570 E | 11/1958 | Mangold et al. |

(Continued)

FOREIGN PATENT DOCUMENTS

| CA | 2710988 | 7/2009 |
| EP | 1236701 | 9/2002 |

(Continued)

OTHER PUBLICATIONS

Kirk-Othmer Encyclopedia of Chemical Technology, vol. 17, pp. 143-167 (1982), "Petroleum (Drilling Fluids)".
(Continued)

*Primary Examiner* — Angela M DiTrani
*Assistant Examiner* — Anuradha Ahuja
(74) *Attorney, Agent, or Firm* — Mathieu Vandermolen; Rachel Greene; Tim Curington (57) ABSTRACT

A method of placing proppant into a fracture formed in a subterranean formation from a wellbore is disclosed. The method comprises injecting through the wellbore a first treatment fluid to initiate the fracture in the subterranean formation; injecting through the wellbore a second treatment fluid comprising a particulate blend slurry made of proppant; the particulate blend comprising at least a first amount of particulates having a first average particle size between about 100 and 5000 μm and at least a second amount of particulates having a second average particle size between about three and twenty times smaller than the first average particle size; and forming with the particulate blend slurry a plurality of proppant-rich clusters spaced apart by proppant-free regions forming open channels.

27 Claims, 2 Drawing Sheets

Related U.S. Application Data 8,008,234, which is a continuation of application No. 12/124,910, filed on May 21, 2008, now Pat. No. 7,789,146.

(60) Provisional application No. 60/951,780, filed on Jul. 25, 2007.

(56) References Cited

U.S. PATENT DOCUMENTS

| | | | |
|---|---|---|---|
| 2,905,245 | A | 9/1959 | De Priester |
| 3,362,475 | A | 1/1968 | Huitt et al. |
| 3,434,540 | A | 3/1969 | Stein |
| 3,675,717 | A | 7/1972 | Goins, Jr. et al. |
| 3,887,474 | A | 6/1975 | Senfe et al. |
| 3,937,283 | A | 2/1976 | Blauer et al. |
| 4,051,900 | A | 10/1977 | Hankins |
| 4,143,715 | A * | 3/1979 | Pavlich .................. 166/271 |
| 4,387,769 | A | 6/1983 | Erbstoesser et al. |
| 4,506,734 | A | 3/1985 | Nolte |
| 4,526,695 | A | 7/1985 | Erbstoesser et al. |
| 4,606,407 | A | 8/1986 | Shu |
| 4,652,257 | A | 3/1987 | Chang |
| 4,665,988 | A | 5/1987 | Murphey et al. |
| 4,670,166 | A | 6/1987 | McDougall et al. |
| 4,718,490 | A | 1/1988 | Uhri |
| 4,738,897 | A | 4/1988 | McDougall et al. |
| 4,785,884 | A | 11/1988 | Armbruster |
| 4,848,467 | A | 7/1989 | Cantu et al. |
| 4,867,241 | A | 9/1989 | Strubhar |
| 4,883,124 | A | 11/1989 | Jennings, Jr. |
| 4,917,185 | A | 4/1990 | Jennings, Jr. et al. |
| 4,951,751 | A | 8/1990 | Jennings, Jr. |
| 4,957,165 | A | 9/1990 | Cantu et al. |
| 4,968,353 | A | 11/1990 | Kawasaki et al. |
| 4,968,354 | A | 11/1990 | Nishiura et al. |
| 4,977,961 | A | 12/1990 | Avasthi |
| 4,986,355 | A | 1/1991 | Casad et al. |
| 5,036,920 | A | 8/1991 | Cornette et al. |
| 5,095,987 | A | 3/1992 | Weaver et al. |
| 5,161,618 | A | 11/1992 | Jones et al. |
| 5,188,837 | A | 2/1993 | Domb |
| 5,238,067 | A | 8/1993 | Jennings, Jr. |
| 5,325,921 | A | 7/1994 | Johnson et al. |
| 5,330,005 | A | 7/1994 | Card et al. |
| 5,332,037 | A | 7/1994 | Schmidt et al. |
| 5,333,689 | A | 8/1994 | Jones et al. |
| 5,415,228 | A | 5/1995 | Price et al. |
| 5,439,055 | A | 8/1995 | Card et al. |
| 5,492,178 | A | 2/1996 | Nguyen et al. |
| 5,501,274 | A | 3/1996 | Nguyen et al. |
| 5,501,275 | A | 3/1996 | Card et al. |
| 5,507,342 | A | 4/1996 | Copeland et al. |
| 5,518,996 | A * | 5/1996 | Maroy et al. .................. 507/100 |
| 5,551,516 | A | 9/1996 | Norman et al. |
| 5,629,271 | A | 5/1997 | Dobson, Jr. et al. |
| 5,713,416 | A | 2/1998 | Chatterji et al. |
| 5,741,758 | A | 4/1998 | Pakulski |
| 5,893,416 | A | 4/1999 | Read |
| 5,908,073 | A | 6/1999 | Nguyen et al. |
| 5,922,652 | A | 7/1999 | Kowalski et al. |
| 5,934,376 | A | 8/1999 | Nguyen et al. |
| 5,964,291 | A | 10/1999 | Bourne et al. |
| 5,979,557 | A | 11/1999 | Card et al. |
| 6,059,034 | A | 5/2000 | Rickards et al. |
| 6,114,410 | A | 9/2000 | Betzold |
| 6,156,805 | A | 12/2000 | Smith et al. |
| 6,172,011 | B1 | 1/2001 | Card et al. |
| 6,209,643 | B1 | 4/2001 | Nguyen et al. |
| 6,209,646 | B1 | 4/2001 | Reddy et al. |
| 6,239,183 | B1 | 5/2001 | Farmer et al. |
| 6,258,859 | B1 | 7/2001 | Dahayanake et al. |
| 6,279,656 | B1 | 8/2001 | Sinclair et al. |
| 6,302,207 | B1 | 10/2001 | Nguyen et al. |
| 6,326,335 | B1 | 12/2001 | Kowalski et al. |
| 6,328,105 | B1 | 12/2001 | Betzold |
| 6,330,916 | B1 | 12/2001 | Rickards et al. |
| 6,364,020 | B1 | 4/2002 | Crawshaw et al. |
| 6,379,865 | B1 | 4/2002 | Mao et al. |
| 6,380,136 | B1 | 4/2002 | Bates et al. |
| 6,435,277 | B1 | 8/2002 | Qu et al. |
| 6,439,309 | B1 | 8/2002 | Matherly et al. |
| 6,446,722 | B2 | 9/2002 | Nguyen et al. |
| 6,464,009 | B2 | 10/2002 | Bland et al. |
| 6,482,517 | B1 | 11/2002 | Anderson |
| 6,506,710 | B1 | 1/2003 | Hoey et al. |
| 6,543,538 | B2 | 4/2003 | Tolman et al. |
| 6,559,245 | B2 | 5/2003 | Mao et al. |
| 6,599,863 | B1 | 7/2003 | Palmer et al. |
| 6,656,265 | B1 | 12/2003 | Garnier et al. |
| 6,703,352 | B2 | 3/2004 | Dahayanake et al. |
| 6,719,054 | B2 | 4/2004 | Cheng et al. |
| 6,723,683 | B2 | 4/2004 | Crossman et al. |
| 6,725,930 | B2 | 4/2004 | Boney et al. |
| 6,742,590 | B1 | 6/2004 | Nguyen |
| 6,776,235 | B1 * | 8/2004 | England .................. 166/271 |
| 6,818,594 | B1 | 11/2004 | Freeman et al. |
| 6,828,280 | B2 | 12/2004 | England et al. |
| 6,860,328 | B2 | 3/2005 | Gonzalez et al. |
| 6,874,578 | B1 | 4/2005 | Garnier et al. |
| 6,877,560 | B2 | 4/2005 | Nguyen et al. |
| 6,938,693 | B2 | 9/2005 | Boney et al. |
| 6,989,195 | B2 | 1/2006 | Anderson |
| 7,004,255 | B2 | 2/2006 | Boney |
| 7,028,775 | B2 | 4/2006 | Fu et al. |
| 7,044,220 | B2 | 5/2006 | Nguyen et al. |
| 7,044,224 | B2 | 5/2006 | Nguyen |
| 7,049,272 | B2 | 5/2006 | Sinclair et al. |
| 7,060,661 | B2 | 6/2006 | Dobson, Sr. et al. |
| 7,066,260 | B2 | 6/2006 | Sullivan et al. |
| 7,084,095 | B2 | 8/2006 | Lee et al. |
| 7,148,185 | B2 | 12/2006 | Fu et al. |
| 7,166,560 | B2 | 1/2007 | Still et al. |
| 7,178,596 | B2 | 2/2007 | Blauch et al. |
| 7,213,651 | B2 | 5/2007 | Brannon et al. |
| 7,219,731 | B2 | 5/2007 | Sullivan et al. |
| 7,237,610 | B1 | 7/2007 | Saini et al. |
| 7,255,169 | B2 | 8/2007 | van Batenburg et al. |
| 7,261,157 | B2 | 8/2007 | Nguyen et al. |
| 7,265,079 | B2 | 9/2007 | Willberg et al. |
| 7,267,170 | B2 | 9/2007 | Mang et al. |
| 7,275,596 | B2 | 10/2007 | Willberg et al. |
| 7,281,580 | B2 | 10/2007 | Parker et al. |
| 7,284,611 | B2 | 10/2007 | Reddy et al. |
| 7,290,615 | B2 | 11/2007 | Christanti et al. |
| 7,294,347 | B2 | 11/2007 | Menjoge et al. |
| 7,303,018 | B2 | 12/2007 | Cawiezel et al. |
| 7,345,012 | B2 | 3/2008 | Chen et al. |
| 7,373,991 | B2 | 5/2008 | Vaidya et al. |
| 7,398,826 | B2 | 7/2008 | Hoefer et al. |
| 7,405,183 | B2 | 7/2008 | Hanes, Jr. |
| 7,419,937 | B2 | 9/2008 | Rimmer et al. |
| 7,451,812 | B2 | 11/2008 | Cooper et al. |
| 7,482,311 | B2 | 1/2009 | Willberg et al. |
| 7,493,955 | B2 | 2/2009 | Gupta et al. |
| 7,494,957 | B2 | 2/2009 | Pena et al. |
| 7,510,009 | B2 | 3/2009 | Cawiezel et al. |
| 7,528,096 | B2 | 5/2009 | Brannon et al. |
| 7,543,640 | B2 | 6/2009 | MacDougall |
| 7,559,369 | B2 | 7/2009 | Roddy et al. |
| 7,565,929 | B2 | 7/2009 | Bustos et al. |
| 7,569,522 | B2 | 8/2009 | Pena et al. |
| 7,571,767 | B2 | 8/2009 | Parker et al. |
| 7,581,590 | B2 | 9/2009 | Lesko et al. |
| 7,624,802 | B2 | 12/2009 | McCrary et al. |
| 7,644,761 | B1 | 1/2010 | Gu et al. |
| 7,703,531 | B2 | 4/2010 | Huang et al. |
| 7,784,541 | B2 | 8/2010 | Hartman et al. |
| 7,789,146 | B2 | 9/2010 | Panga et al. |
| 7,806,182 | B2 | 10/2010 | Waters et al. |
| 7,833,947 | B1 | 11/2010 | Kubala |
| 7,923,415 | B2 | 4/2011 | Panga et al. |
| 7,931,088 | B2 | 4/2011 | Stegemoeller et al. |
| 7,954,548 | B2 | 6/2011 | Curimbaba et al. |

(56) References Cited

U.S. PATENT DOCUMENTS

| | | |
|---|---|---|
| 7,973,991 B2 | 7/2011 | Watanabe |
| 8,008,234 B2 | 8/2011 | Panga et al. |
| 8,119,574 B2 | 2/2012 | Panga et al. |
| 8,167,043 B2 | 5/2012 | Willberg et al. |
| 8,168,570 B2 | 5/2012 | Barron et al. |
| 8,210,249 B2 | 7/2012 | Panga et al. |
| 2003/0134751 A1 | 7/2003 | Lee et al. |
| 2004/0060702 A1 | 4/2004 | Kotlar et al. |
| 2004/0074646 A1 | 4/2004 | Kotlar et al. |
| 2004/0106525 A1 | 6/2004 | Willberg et al. |
| 2004/0152601 A1 | 8/2004 | Still et al. |
| 2004/0209780 A1 | 10/2004 | Harris et al. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2005/0027499 A1 | 2/2005 | Bourbiaux et al. |
| 2005/0103496 A1 | 5/2005 | Todd et al. |
| 2005/0130845 A1 | 6/2005 | Freeman et al. |
| 2005/0130848 A1 | 6/2005 | Todd et al. |
| 2005/0161220 A1 | 7/2005 | Todd et al. |
| 2005/0172699 A1 | 8/2005 | Hu et al. |
| 2005/0233895 A1 | 10/2005 | Mertens et al. |
| 2005/0252651 A1 | 11/2005 | Bosma et al. |
| 2005/0252659 A1 | 11/2005 | Sullivan et al. |
| 2006/0006539 A1 | 1/2006 | Matsui et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0054324 A1 | 3/2006 | Sullivan et al. |
| 2006/0058197 A1 | 3/2006 | Brown et al. |
| 2006/0073980 A1 | 4/2006 | Brannon et al. |
| 2006/0113078 A1 | 6/2006 | Nguyen et al. |
| 2006/0124302 A1 | 6/2006 | Gupta et al. |
| 2006/0151173 A1 | 7/2006 | Slabaugh et al. |
| 2006/0157243 A1 | 7/2006 | Nguyen |
| 2006/0175059 A1 | 8/2006 | Sinclair et al. |
| 2006/0185848 A1 | 8/2006 | Surjaatmadja et al. |
| 2006/0289160 A1 | 12/2006 | van Batenburg et al. |
| 2007/0017675 A1 | 1/2007 | Hammami et al. |
| 2007/0029086 A1 | 2/2007 | East, Jr. |
| 2007/0039733 A1 | 2/2007 | Welton et al. |
| 2007/0042912 A1 | 2/2007 | Welton et al. |
| 2007/0044963 A1 | 3/2007 | MacDougall |
| 2007/0238623 A1 | 10/2007 | Saini et al. |
| 2008/0000391 A1 | 1/2008 | Drochon |
| 2008/0000638 A1 | 1/2008 | Burukhin et al. |
| 2008/0053657 A1 | 3/2008 | Alary et al. |
| 2008/0066910 A1 | 3/2008 | Alary et al. |
| 2008/0093073 A1 | 4/2008 | Bustos et al. |
| 2008/0103065 A1 | 5/2008 | Reddy et al. |
| 2008/0108520 A1 | 5/2008 | Fu |
| 2008/0121395 A1 | 5/2008 | Reddy et al. |
| 2008/0135242 A1* | 6/2008 | Lesko et al. ............ 166/268 |
| 2008/0135250 A1 | 6/2008 | Bosma et al. |
| 2008/0210423 A1 | 9/2008 | Boney |
| 2008/0280788 A1 | 11/2008 | Parris et al. |
| 2008/0280790 A1 | 11/2008 | Mirakyan et al. |
| 2008/0314594 A1 | 12/2008 | Still et al. |
| 2008/0318026 A1 | 12/2008 | Dai et al. |
| 2009/0008095 A1 | 1/2009 | Duncum et al. |
| 2009/0025394 A1 | 1/2009 | Bonzani et al. |
| 2009/0025932 A1 | 1/2009 | Panga et al. |
| 2009/0025934 A1* | 1/2009 | Hartman et al. .......... 166/280.2 |
| 2009/0107671 A1* | 4/2009 | Waters et al. .............. 166/280.1 |
| 2009/0294126 A1 | 12/2009 | Dalrymple et al. |
| 2010/0000735 A1 | 1/2010 | Weaver et al. |
| 2010/0087341 A1 | 4/2010 | Alary et al. |
| 2010/0087342 A1 | 4/2010 | Alary et al. |
| 2010/0089580 A1 | 4/2010 | Brannon et al. |
| 2010/0126722 A1 | 5/2010 | Cornelissen et al. |
| 2010/0163225 A1 | 7/2010 | Abad et al. |
| 2010/0200247 A1 | 8/2010 | Dybevik et al. |
| 2010/0252259 A1 | 10/2010 | Horton |
| 2010/0300688 A1 | 12/2010 | Panga et al. |
| 2011/0005760 A1 | 1/2011 | Hartman et al. |
| 2011/0036577 A1 | 2/2011 | Barmatov et al. |
| 2011/0053813 A1 | 3/2011 | Panga et al. |
| 2011/0083849 A1 | 4/2011 | Medvedev et al. |
| 2011/0098202 A1 | 4/2011 | James et al. |
| 2011/0155371 A1 | 6/2011 | Panga et al. |
| 2011/0198089 A1 | 8/2011 | Panga et al. |
| 2011/0247812 A1 | 10/2011 | Panga et al. |
| 2011/0312857 A1 | 12/2011 | Amanullah et al. |
| 2012/0000641 A1 | 1/2012 | Panga et al. |
| 2012/0000651 A1 | 1/2012 | Panga et al. |
| 2012/0132421 A1 | 5/2012 | Loiseau et al. |
| 2012/0138296 A1 | 6/2012 | Panga et al. |
| 2012/0190598 A1 | 7/2012 | McCubbins, Jr. et al. |
| 2012/0247764 A1 | 10/2012 | Chen et al. |
| 2012/0285694 A1 | 11/2012 | Morvan et al. |
| 2012/0305254 A1 | 12/2012 | Chen et al. |

FOREIGN PATENT DOCUMENTS

| | | |
|---|---|---|
| EP | 2473705 A | 7/2012 |
| GB | 2277543 | 11/1994 |
| RU | 2065442 | 8/1996 |
| RU | 2221130 | 1/2004 |
| RU | 2376451 | 12/2009 |
| RU | 2404359 | 11/2010 |
| RU | 2413064 | 2/2011 |
| RU | 2417243 | 4/2011 |
| WO | WO9607710 | 3/1996 |
| WO | WO9930249 | 6/1999 |
| WO | WO2004007904 | 1/2004 |
| WO | WO2004038176 | 5/2004 |
| WO | 2006082359 | 8/2006 |
| WO | WO2007086771 * | 8/2007 |
| WO | WO2009013710 | 1/2009 |
| WO | 2009088317 | 7/2009 |
| WO | WO2009106796 | 9/2009 |
| WO | WO2009141749 | 11/2009 |
| WO | WO2010117547 | 10/2010 |
| WO | WO2011024100 | 3/2011 |
| WO | WO2011129937 | 10/2011 |
| WO | WO2011143055 | 11/2011 |
| WO | WO2012001574 | 1/2012 |

OTHER PUBLICATIONS

Kirk-Othmer Encyclopedia of Chemical Technology, vol. 7, pp. 297-299 (1965).
SPE 131783—Less Sand May Not be Enough, M. Curry, T. Maloney, R. Woodroff, and R. Leonard, Feb. 23-25, 2010, SPR Unconventional Gas Conference, Pittsburg, PA, USA.
ARMA/USRMS 05-780—Experiments and numerical simulation of hydraulic fracturing in naturally fractured rock, C.J. De Pater and L.J.L. Beugelsdijk, Jun. 25-29, 2010, The 40th U.S. Symposium of Rock Mechanics (USRMS), Anchorage, AK, USA.
Nolte, K.G.: "Application of Fracture Design Based on Pressure Analysis," SPE13393—SPE Production Engineering, vol. 3, No. 1, 31-42, Feb. 1988.
Nolte, K.G. and Smith, M.B.: "Interpretation of Fracturing Pressures,"—SPE8297—JPT, vol. 12, No. 8, pp. 1767-1775, Sep. 1981.
Smith, M.B., Miller II, W.K., and Haga, J.: "Tip Screenout Fracturing: A Technique for Soft, Unstable Formations," SPE13273—SPE Production Engineering, vol. 2, No. 2, 95-103, May 1987.
Asgian, M.I., Cundall, P.A., and Brady, B.H. (1995) "Mechanical Stability of Porpped Hydraulic Fractures: A Numerical Study",—SPE28510—JPT, 203-208, Mar. 1995.
Milton-Tayler, D., Stephenson, C., and Asgian, M. (1992) "Factors Affecting the Stability of Proppant in Propped Fractures: Results of a Laboratory Study," paper SPE 24821 presented at the SPE Annual Technical Conference and Exhibition, Washington, DC, Oct. 4-7.
Desroches, J., et al. (1994) The Crack Tip Region in Hydraulic Fracturing. Proc. R. Soc. Lond. A, 447: p. 39-48.
Schlumberger CemCRETE Brochure (2003).
Schlumberger Cementing Services and Products—Materials, pp. 39-76 (2012).
SPE 119366—Fracture Design Considerations in Horizontal Wells Drilled in Unconventional Gas Reservoirs; Cipolla, C.L., Lolon, E.P., Mayerhofer, M.J., and Warpinski, N.R. (2009).

(56) References Cited

OTHER PUBLICATIONS

Economides M.J. and Nolte K.G., Reservoir Stimulation, John Wiley and Sons, Ltd, 3rd Edition New York, 2000—Chapter 10, "Fracture Treatment Design" by Jack Elbel and Larry Britt, (pp. 10-1 to 10-50).
Economides M.J. and Nolte K.G., Reservoir Stimulation, John Wiley and Sons, Ltd, 3rd Edition New York, 2000—Chapter 8, "Performance of Fracturing Materials" by V.G Constien et al., (pp. 8-1 to 8-26).
Economides M.J. and Nolte K.G., Reservoir Stimulation, John Wiley and Sons, Ltd, 3rd Edition New York, 2000—Chapter 5, "Basics of Hydraulic Fracturing" by M.B.Smith and J.W. Shlyapobersky, (pp. 5-1 to 5-28).
Economides M.J. and Nolte K.G., Reservoir Stimulation, John Wiley and Sons, Ltd, 3rd Edition New York, 2000—Chapter 7, "Fracturing Fluid Chemistry and Proppants" by Janet Gulbis and Richard M.Hogde, (pp. 7-1 to 7-23).
Aveyard et al; "Emulsions stabilised solely by colloidal particles"; Advances in Colloid and Interface Science 100-102 pp. 503-546 (2003).
Binks et al; "Pickering emulsions stabilized by monodisperse latex particles: Effects of particle size"; Langmuir vol. 17 iss:15 p. 4540-4547 (2001).
Montagne etal; "Highly magnetic latexes from submicrometer oil in water ferrofluid emulsions"; Journal of polymer science. Part A, Polymer chemistry vol. 44 iss:8 p. 2642-2656 (2006).
Park et al; "Rheological Properties and Stabilization of Magnetorheological Fluids in a Water-in-Oil Emulsion"; Journal of Colloid and Interface Science 240, 349-354 (2001).
Pickering, Su; "Emulsions" Journal of the Chemical Society vol. 91pages2001-2021 (1907).
International Search Report of International Application No. PCT/US2012/031223 issued Nov. 23, 2012.
Kirk-Othmer Encyclopedia of Chemical Technology, vol. 16, pp. 248-273 (entitled "Nuts"), (1981).
Thiercelin, etal, "On the Modeling of Near Tip Processes in Hydraulic Fractures", pp. 537-540.

* cited by examiner

PROPPANT PILLAR PLACEMENT IN A FRACTURE WITH HIGH SOLID CONTENT FLUID

RELATED APPLICATIONS

This application is a continuation-in-part of U.S. patent application Ser. No. 12/827,434, filed Jun. 30, 2010, now U.S. Pat. No. 8,490,698, which is a continuation-in-part of U.S. patent application Ser. No. 12/816,473, filed Jun. 16, 2010, now U.S. Pat. No. 8,008,234, which is a continuation of U.S. patent application Ser. No. 12/124,910, filed May 21, 2008, now U.S. Pat. No. 7,789,146, which claims priority to and the benefit of provisional U.S. patent application Ser. No. 60/951,780, filed Jul. 25, 2007.

FIELD OF THE INVENTION

The invention relates to stimulation of wells penetrating subterranean formations, to fracture stimulation by injection of proppant into a fracture to form regions of low resistance to flow through the fracture for the production of hydrocarbons and in some cases by using a high solid content fluid.

BACKGROUND

Various methods are known for fracturing a subterranean formation to enhance the production of fluids therefrom. In the typical application, a pressurized fracturing fluid hydraulically creates and propagates a fracture. The fracturing fluid carries proppant particulates into the extending fracture. When the fracturing fluid is removed, the fracture does not completely close from the loss of hydraulic pressure; instead, the fracture remains propped open by the packed proppant, allowing fluids to flow from the formation through the proppant pack to the production wellbore.

The success of the fracturing treatment may depend on the ability of fluids to flow from the formation through the proppant pack. In other words, the proppant pack or matrix must have a high permeability relative to the formation for fluid to flow with low resistance to the wellbore. Furthermore, the surface regions of the fracture should not be significantly damaged by the fracturing to retain fluid permeability for optimal flow from the formation into the fracture and the proppant pack.

The prior art has sought to increase the permeability of the proppant pack by increasing the porosity of the interstitial channels between adjacent proppant particles within the proppant matrix. For example, U.S. Pat. No. 7,255,169, U.S. Pat. No. 7,281,580, U.S. Pat. No. 7,571,767 incorporated herewith by reference discloses a method of forming a high porosity propped fracture with a slurry that includes a fracturing fluid, proppant particulates and a weighting agent. These prior art technologies seek to distribute the porosity and interstitial flow passages as uniformly as possible in the consolidated proppant matrix filling the fracture, and thus employ homogeneous proppant placement procedures to substantially uniformly distribute the proppant and non-proppant, porosity-inducing materials within the fracture. In another approach, proppant particulates and degradable material do not segregate before, during or after injection to help maintain uniformity within the proppant matrix. Fracturing fluids are thoroughly mixed to prevent any segregation of proppant and non-proppant particulates. In another approach, non-proppant materials have a size, shape and specific gravity similar to that of the proppant to maintain substantial uniformity within the mixture of particles in the fracturing fluid and within the resulting proppant pack. A tackifying compound coating on the particulates has also been used to enhance the homogenous distribution of proppant and non-proppant particulates as they are blended and pumped downhole into a fracture.

A recent approach to improving hydraulic fracture conductivity has been to try to construct proppant clusters in the fracture, as opposed to constructing a continuous proppant pack. U.S. Pat. No. 6,776,235 incorporated herewith by reference discloses a method for hydraulically fracturing a subterranean formation involving alternating stages of proppant-containing hydraulic fracturing fluids contrasting in their proppant-settling rates to form proppant clusters as posts that prevent fracture closing. This method alternates the stages of proppant-laden and proppant-free fracturing fluids to create proppant clusters, or islands, in the fracture and channels between them for formation fluids to flow. The amount of proppant deposited in the fracture during each stage is modulated by varying the fluid transport characteristics (such as viscosity and elasticity), the proppant densities, diameters, and concentrations and the fracturing fluid injection rate. However, the positioning of the proppant-containing fluid is difficult to control. For example, the proppant-containing fluid can have a higher density than the proppant-free fluid and can thus underride the proppant-free fluid. This underride can result in non-uniform distribution of proppant clusters, which in turn can lead to excessive fracture closure where there is not enough proppant and constricted flow channels where there is too much proppant.

It is an object of the present invention to provide an improved method of propping a fracture, or a part of a fracture.

SUMMARY

According to some embodiments, the method comprises injecting through the wellbore a first treatment fluid to initiate the fracture in the subterranean formation; injecting through the wellbore a second treatment fluid comprising a particulate blend slurry made of proppant; the particulate blend comprising at least a first amount of particulates having a first average particle size between about 100 and 5000 µm and at least a second amount of particulates having a second average particle size between about three and twenty times smaller than the first average particle size; and forming with the particulate blend slurry a plurality of proppant-rich clusters spaced apart by proppant-free regions forming open channels.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments and should not be construed as a limitation to the scope. While the compositions are described herein as comprising certain materials, it should be understood that the composition could optionally comprise two or more chemically different materials. In addition, the composition can also comprise some components other than the ones already cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

In hydraulic and acid fracturing, a first, viscous fluid called a "pad" is typically injected into the formation to initiate and propagate the fracture. This is followed by a second fluid that contains a proppant to keep the fracture open after the pumping pressure is released. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Occasionally, hydraulic fracturing is done without a highly viscosified fluid (i.e., slick water) to minimize the damage caused by polymers or the cost of other viscosifiers.

Fracturing fluids according to the present method can include proppant and optionally a removable proppant-spacing material, which can function to form open channels around the proppant pillars. These extramatrical channel-forming materials, including proppant-spacing particles, are referred to herein as "channelant."

As used herein, the term "open channels" refers to interconnected passageways formed in the proppant-fracture structure. Open channels are distinct from interstitial passages between individual proppant particles in the proppant matrix in that the channels fully extend between opposing fracture faces, free of obstruction by proppant or other flow-impeding structures, and exist outside the proppant matrix, laterally bounded by the proppant pillars. Such open channels generally have a hydraulic radius, and hence a hydraulic conductivity, that is at least an order of magnitude larger than that of interstitial flow passages through the proppant matrix.

The open channels can be formed by placing the proppant and optional channelant in the fracture in such a way that the pillar-forming proppant islands are ultimately segregated from the channel-forming removable material. The segregation can occur or begin in the preparation, mixing or pumping of the treatment fluid, in the injection of the treatment fluid in the fracture, in or after the proppant placement, packing or settling in the fracture, by a distinct post-injection step of chemical and/or mechanical manipulation or treatment of the proppant/channelant following initial placement in the fracture, or by aggregating and consolidating the proppant during the channelant removal.

In the case channelant is used, the terms "segregation," "segregating" and the like refer to any heterogeneous proppant/channelant distribution between proppant-rich pillar-forming islands or regions and proppant-lean channelant regions. It may not be necessary to keep the proppant-rich regions entirely free of channelant because the presence of channelant, especially in relatively minor amounts, may not exceed any level that prevents the formation or consolidation of the proppant into pillars of sufficient strength to prevent the fracture from closing. In an embodiment, the channelant can function in the proppant or proppant regions to consolidate or reinforce the proppant islands and/or to strengthen the proppant pillars. Conversely, the channelant regions can contain proppant particles, especially relatively minor amounts, which remain unconsolidated or do not otherwise prevent removal of the channelant to form the open channels and which do not result in obstruction or excessive clogging of the open channels by the proppant.

Figure 1:
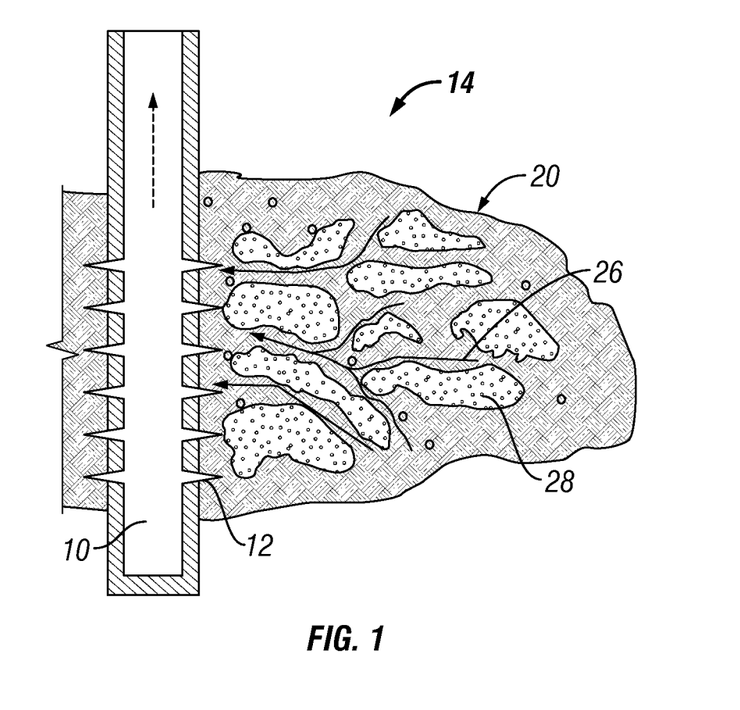
FIG. 1 schematically illustrates in section placement of proppant and removable channelant in a hydraulic fracture operation according to one embodiment.

A simplified first embodiment of the method is illustrated with reference to FIG. 1. A wellbore 10 can be completed with perforations 12 in formation 14. A first treatment fluid optionally substantially free of particles, a pad, can be injected through the wellbore 10 to initiate and propagate a fracture 20. The first treatment fluid optionally comprises a gas and a viscosifying agent. Segregated proppant particles are injected through the wellbore 10 into the fracture 20 in a second treatment fluid comprising alternating stages of a proppant-rich phase made of high solid content slurry or proppant laden phase and a proppant-free phase optionally comprising a gas and a viscosifying agent. The proppant particles are heterogeneously placed in respective proppant-rich islands or clusters 28 forming pillars spaced apart by proppant-free regions or channels 26. The fracture 20 can be allowed to close, and the proppant blend islands 28 compressed to form pillars to support the fracture 20 and prevent the opposing fracture faces from contacting each other. Due to the viscoelastic properties of the second treatment fluid the alternating stages pick up the proppant and form localized clusters (similar to the wedges) and redistribute them farther up and out into the fracture. The stages of the second treatment fluid can be alternated many times to achieve varied distribution of the clusters in the fracture. This phenomenon will create small pillars in the fracture that will help keep more of the fracture open and create higher overall conductivity and effective fracture half-length.

Figure 2:
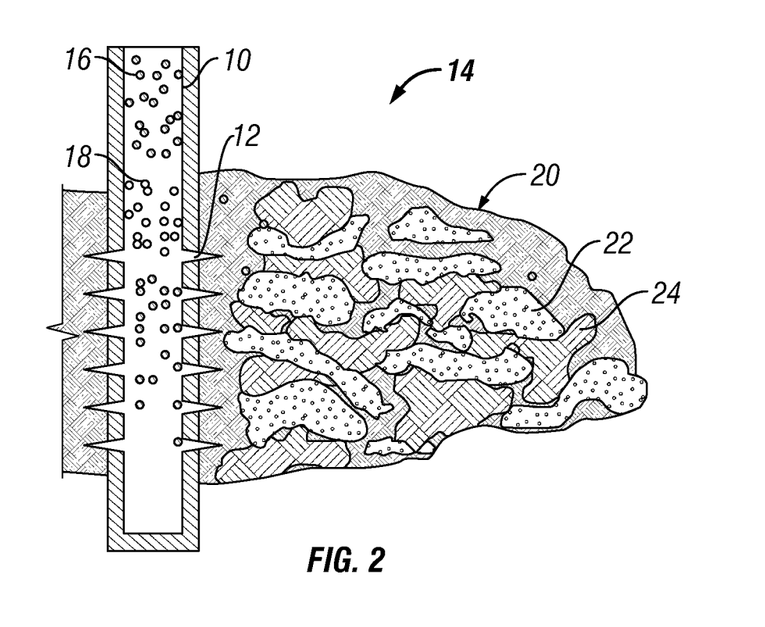
FIG. 2 schematically illustrates in section the arrangement of the wellbore, perforations and the proppant pillars in the fracture according to a second embodiment.

A simplified second embodiment of the method is illustrated with reference to FIG. 2. A wellbore 10 can be completed with perforations 12 in formation 14. A first treatment fluid optionally substantially free of particles, a pad, can be injected through the wellbore 10 to initiate and propagate a fracture 20. The first treatment fluid optionally comprises a gas and a viscosifying agent. Segregated proppant particles 16 and channelant particles 18 can be injected in a second treatment fluid made of high solid content slurry through the wellbore 10 into the fracture 20, where they can be heterogeneously placed in respective proppant-rich islands or clusters 22 forming pillars spaced apart by channelant-rich regions 24. The fracture 20 can be allowed to close, and the proppant blend islands 22 compressed to form pillars to support the fracture 20 and prevent the opposing fracture faces from contacting each other. The channelant can be packed in the proppant-lean regions 24 and can help restrict the islands 22 from creeping or spreading laterally due to compression by the weight of the formation, thereby facilitating a greater height or open dimension of the resulting propped fracture and a greater hydraulic conductivity.

During the next operative step, the channelant can be removed in various embodiments by flushing, dissolving, softening, melting, breaking, or degrading the channelant, wholly or partially, via a suitable activation mechanism, such as, but not limited to, temperature, time, pH, salinity, solvent introduction, catalyst introduction, hydrolysis, and the like, or any combination thereof. The activation mechanism can be triggered by ambient conditions in the formation, by the invasion of formation fluids, exposure to water, passage of time, by the presence of incipient or delayed reactants in or mixed with the channelant particles, by the post-injection introduction of an activating fluid, or the like, or any combination of these triggers. Then, the formation fluid can be allowed to invade the fracture 20 to displace any channelant, channelant solution, channelant degradation products, and any unconsolidated proppant or other particles, from the proppant-lean regions. For example, the channelant can simply be unconsolidated so that it can be removed hydraulically, or can include unconsolidated particles that can be removed hydraulically, e.g. by flushing the fracture with formation fluid and/or an injected flushing or back-flushing fluid. A network of interconnected open channels can thus be formed around the pillars to provide the fracture 20 with high conductivity for fluid flow. Fluids can now be produced from the formation 14, into the fracture 20, through the open channels and perforations 12, and into the wellbore 10.

The channelant can be removed mechanically, for example by using fluid to push channelant out of the formation. In such instances, the channelant can remain in a solid state from the time of injection through removal from the fracture. Some suitable materials that can resist degradation and crushing include glass, ceramics, carbon and carbon-based compounds, metals and metallic alloys, and high-density plastics that are oil-resistant and exhibit a crystallinity of greater than about 10%. Some other suitable high density plastic materials include nylons, acrylics, styrenes, polyesters, polyethylenes, oil-resistant thermoset resins and combinations thereof.

Alternatively, the channelant can be softened, dissolved, reacted or otherwise made to degrade. Materials suitable for dissolvable channelant include for example, and without limitation, polyvinyl alcohol (PVOH) fibers, salt, wax, calcium carbonate, and the like and combinations thereof. An oil-degradable channelant can be selected, so that it will be degraded by produced fluids. Alternatively, a channelant can be selected which is degraded by agents purposefully placed in the formation by injection, wherein mixing the channelant with the agent induces a delayed reaction degradation of the channelant.

In some fracturing operations, a solid acid-precursor can be used as the degradable channelant. Suitable acid-generating dissolvable channelants can include for example, and without limitation, PLA, PGA, carboxylic acid, lactide, glycolide, copolymers of PLA or PGA, and the like and combinations thereof. Provided that the formation rock is carbonate, dolomite, sandstone, or otherwise acid reactive, then the hydrolyzed product of the channelant, a reactive liquid acid, can etch the formation at surfaces exposed between the proppant pillars. This etching can enlarge the open channels and thus further enhance the conductivity between the pillars. Other uses of the generated acid fluid can include aiding in the breaking of residual gel, facilitating consolidation of proppant clusters, curing or softening resin coatings and increasing proppant permeability.

In some embodiments, the channelant may be formed of, or contain, a fluoride source capable of generating hydrofluoric acid upon release of fluorine and adequate protonation. Some nonlimiting examples of fluoride sources which are effective for generating hydrofluoric acid include fluoboric acid, ammonium fluoride, ammonium fluoride, and the like, or any mixtures thereof.

During hydraulic fracturing, high pressure pumps on the surface inject the fracturing fluid into a wellbore adjacent to the face or pay zone of a geologic formation. The first stage, also referred to as the "pad stage" involves injecting a first treatment fluid into the wellbore at a sufficiently high flow rate and pressure sufficient to literally break or fracture a portion of surrounding strata at the sand face. The pad stage is pumped until the fracture has sufficient dimensions to accommodate the subsequent slurry pumped in the proppant stage. The volume of the pad can be designed by those knowledgeable in the art of fracture design, for example, as described in Reservoir Stimulation, 3rd Ed., M. J. Economides, K. G. Nolte, Editors, John Wiley and Sons, New York, 2000, incorporated herewith by reference.

According to one embodiment, the pad comprises a gaseous component or a supercritical fluid to form a foam or energized fluid. For example, a gas such as air, nitrogen or carbon dioxide, a supercritical fluid as supercritical carbon dioxide can be used to provide an energized fluid or foam. Among other benefits, the dispersion of the gas into the first fluid in the form of bubbles or droplets increases the viscosity of such fluid and impacts positively its performance, particularly its ability to effectively induce hydraulic fracturing of the formation, and also its capacity to carry solids ("proppants") that are placed within the fractures to create pathways through which oil or gas can be further produced. The presence of the gas also enhances the flowback of the first fluid from the interstices of the formation and of the proppant pack into the wellbore, due to the expansion of such gas once the pressure is reduced at the wellhead at the end of the fracturing operation.

The first foamed or energized fluid may contain "foamers", most commonly surfactant or blends of surfactants that facilitate the dispersion of the gas into the first fluid in the form of small bubbles or droplets, and confer stability to the dispersion by retarding the coalescence or recombination of such bubbles or droplets. Foamed and energized fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value.

According to some embodiments the first treatment fluid may be a stable foamed fluid as described in U.S. Pat. Nos. 7,494,957 and 7,569,522, all incorporated by reference in their entirety herewith. The gas forming the foam, pumped in the pad stage expands when the well is flowed back and displaces the fluid from created channels and improves the fracture clean-up process and essentially the initial production. The gas component of the first treatment fluid may be produced from any suitable gas that forms an energized fluid when introduced into the aqueous medium. See, for example, U.S. Pat. No. 3,937,283 (Blauer et al.) hereinafter incorporated by reference. The gas component may comprise a gas selected from the group consisting of nitrogen, air, carbon dioxide and any mixtures thereof. The gas component may comprise carbon dioxide, in any quality readily available. The gas component assists in the fracturing operation and the well clean-up process. The first fluid may contain from about 10% to about 90% volume gas component based upon total first fluid volume percent, from about 30% to about 80% volume gas component based upon total first fluid volume percent, and from about 40% to about 70% volume gas component based upon total first fluid volume percent.

The first treatment fluid may comprise further a viscosifying agent or a friction reducer agent. The first treatment fluid comprises a carrier fluid, which as discussed may be a gaseous component or a supercritical fluid, or any other conventional carrier fluid in the art. Water-based fracturing fluids are common, with natural or synthetic water-soluble polymers optionally added to increase fluid viscosity, and can be with the first treatment fluid and subsequent with the second treatment fluid made of proppant and/or channelant. These polymers include, but are not limited to, guar gums; high-molecular-weight polysaccharides composed of mannose and galactose sugars; or guar derivatives, such as hydroxypropyl guar, carboxymethyl guar, carboxymethylhydroxypropyl guar, and the like. Cross-linking agents based on boron, titanium, zirconium or aluminum complexes are typically used to increase the effective molecular weight of the polymer for use in high-temperature wells. To a small extent, cellulose derivatives, such as hydroxyethylcellulose or hydroxypropylcellulose and carboxymethylhydroxyethylcellulose, are used with or without cross-linkers. Two biopolymers—xanthan and scleroglucan—provide excellent proppant suspension, but are more expensive than guar derivatives and so are used less frequently. Polyacrylamide and polyacrylate polymers and copolymers are typically used for high-temperature applications or as friction reducers at low concentrations for all temperatures ranges. Polymer-free, water-base fracturing fluids can also be obtained using viscoelastic surfactants. Usually, these fluids are prepared by mixing in appropriate amounts of suitable surfactants, such as anionic, cationic, nonionic, amphoteric, and zwiterionic. The viscosity of viscoelastic surfactant fluids are attributed to the three-dimensional structure formed by the fluid's components. When the surfactant concentration in a viscoelastic fluid significantly exceeds a critical concentration, and in most cases in the presence of an electrolyte, surfactant molecules aggregate into species, such as worm-like or rod-like micelles, which can interact to form a network exhibiting viscous and elastic behavior.

In one embodiment, after the fracture is induced, proppant can be injected with the second treatment fluid into the fracture as a slurry or suspension of particles in the fracturing fluid during what is referred to herein as the "proppant stage." The pad stage is followed with a sequence of proppant-laden and proppant-free stages to create the network of the open channels inside the fracture. The fluid used in the proppant-laden and proppant-free stages can be of the same nature and be crosslinked to facilitate the proppant transport. It can also be of the different nature: crosslinked in proppant-laden stages and linear, crosslinked or energized/foamed in proppant-free stages. The proppant-free stage can be of the same type as the first treatment fluid i.e. foamed or energized fluid. According to one embodiment, the stages of proppant-rich phase and proppant-free phase are separated by injection of a fiber spacer. This fibers can include, for example, glass, ceramics, carbon and carbon-based compounds, metals and metallic alloys, and the like and combinations thereof. Also the fibers can include, for example, polylactic acid, polyglycolic acid, polyethylterephthalate (PET), polyol, and the like and combinations thereof.

The proppant-rich phase made of high solid content slurry or proppant laden phase stage includes a slurry with a particulate blend made of proppant; the particulate blend comprising at least a first amount of particulates having a first average particle size between about 100 and 5000 µm and at least a second amount of particulates having a second average particle size between about three and twenty times smaller than the first average particle size. In one embodiment, the slurry comprises particulate materials with defined particles size distribution. One example of realization is disclosed in U.S. Pat. No. 7,784,541, herewith incorporated by reference in its entirety, which discloses treatment fluids wherein a sum of all the particulates in the fracturing slurry exceed 1.92 kg per liter of carrier fluid (16 pounds per gallon), or exceed 2.4 kg per liter of carrier fluid (20 pounds per gallon), or exceed 2.76 kg per liter of carrier fluid (23 pounds per gallon), or exceed 3.6 kg per liter of carrier fluid (30 pounds per gallon). In certain embodiments, the selection of the size for the first amount of particulates is dependent upon the characteristics of the propped fracture, for example the closure stress of the fracture, the desired conductivity, the size of fines or sand that may migrate from the formation, and other considerations understood in the art.

The selection of the size of the second amount of particulates is dependent upon maximizing or optimizing a packed volume fraction (PVF) of the mixture of the first amount of particulates and the second amount of particulates. The packed volume fraction or packing volume fraction (PVF) is the fraction of solid content volume to the total volume content. A second average particle size of between about seven to ten times smaller than the first amount of particulates contributes to maximizing the PVF of the mixture, but a size between about three to twenty times smaller, and in certain embodiments between about three to fifteen times smaller, and in certain embodiments between about three to ten times smaller will provide a sufficient PVF for most slurry. Further, the selection of the size of the second amount of particulates is dependent upon the composition and commercial availability of particulates of the type comprising the second amount of particulates. In certain embodiments, the particulates combine to have a PVF above 0.70, 074 or 0.75 or above 0.80. In certain further embodiments the particulates may have a much higher PVF approaching 0.95.

The slurry may further include a third amount of particulates having a third average particle size that is smaller than the second average particle size. In certain further embodiments, the slurry may have a fourth or a fifth amount of particles. Also in some embodiments, the same chemistry can be used for the third, fourth, or fifth average particle size. Also in some embodiments, different chemistry can be used for the same third average particle size: e.g. in the third average particle size, half of the amount is a certain type of proppant and the other half is another type of proppant. For the purposes of enhancing the PVF of the slurry, more than three or four particles sizes will not typically be required. However, additional particles may be added for other reasons, such as the chemical composition of the additional particles, the ease of manufacturing certain materials into the same particles versus into separate particles, the commercial availability of particles having certain properties, and other reasons understood in the art.

According to a further embodiment, the slurry may contain a binding agent such as resins and cement that can be activated downhole to bind all the individual components in the slurry to form a strong pillar. The advantages with this type of pillar is that it is much stronger than a proppant slug made of individual proppant particles as the slurry with maximized PVF contains greater than 50% solids in each pillar and has a high packing density and in that, the binding agent prevents the pillar from disintegrating during production whereas in conventional proppant pillars the proppant particles are subject to movement during production which can disintegrate the pack. The binding agent may be resins (epoxy, furan, phenolic etc.), cement, sticky fibers, polymers that exhibit sticky properties at high temperature and all additives giving the same properties already disclosed in the present description.

The durations of the proppant-laden and proppant-free stages, as well as the concentration of proppant are selected based on the geomechanical properties of the formation and desired fracture geometry. The volumes of the particle-laden and particle-free stages may be the same or different and may vary from 1 bbl to 30 bbl.

As a result, the proppant does not completely fill the fracture. Rather, spaced proppant clusters form as pillars. The volumes of proppant and carrier sub-stages as pumped can be different. That is, the volume of the carrier substages can be larger or smaller than the volume of the proppant and/or any mixed substages. Furthermore, the volumes and order of injection of these substages can change over the duration of the proppant stage. That is, proppant substages pumped early in the treatment can be of a smaller volume then a proppant substage pumped later in the treatment. The relative volume of the substages can be selected by the engineer based on how much of the surface area of the fracture it is desired to be supported by the clusters of proppant, and how much of the fracture area is desired as open channels through which formation fluids are free to flow.

Suitable proppants can include sand, gravel, glass beads, ceramics, bauxites, glass, and the like or combinations thereof. Also other proppants like, plastic beads such as styrene divinylbenzene, and particulate metals may be used. Proppant used in this application may not necessarily require the same permeability properties as typically required in conventional treatments because the overall fracture permeability will at least partially develop from formation of channels. Other proppants may be materials such as drill cuttings that are circulated out of the well. Also, naturally occurring particulate materials may be used as proppants, including, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc, some nonlimiting examples of which are proppants made of walnut hulls impregnated and encapsulated with resins. Further information on some of the above-noted compositions thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference. Resin coated (various resin and plastic coatings) or encapsulated proppants having a base of any of the previously listed propping materials such as sand, ceramics, bauxite, nut shells, etc. may be used in accordance with the invention. Essentially, the proppant can be any material that will hold open the propped portion of the fracture.

The selection of proppant can balance the factors of proppant long-term strength, proppant distribution characteristics, proppant PVF in the slurry and proppant cost. The proppant can have the ability to flow deeply into the hydraulic fracture and form spaced pillars that resist crushing upon being subjected to the fracture closure stress. Relatively inexpensive, low-strength materials, such as sand, can be used for hydraulic fracturing of formations with small internal stresses. Materials of greater cost, such as ceramics, bauxites and others, can be used in formations with higher internal stresses. Further, the chemical interaction between produced fluids and proppants, which can significantly change the characteristics of the proppant, can be considered.

In further embodiments, reinforcing and/or consolidating material can be introduced into the fracture fluid to increase the strength of the proppant clusters formed and prevent their collapse during fracture closure. Typically the reinforcement material can be added to the proppant substage and/or the mixed substage. For example, the reinforcement material can be a fiber that serves to reinforce the proppant clusters, but can be removed as or with the channelant from the proppant-lean regions. The concentrations of both proppant and the reinforcing materials can vary in time throughout the proppant stage, and from substage to substage. That is, the concentration of proppant reinforcing material can be different at two subsequent substages. It can also be suitable in some applications of the present method to introduce the reinforcing material in a continuous or semi-continuous fashion throughout the proppant stage, during a plurality of adjacent carrier, channelant, mixed and proppant substages. In any case, introduction of the reinforcing material need not be limited only to the proppant substage. Particularly, different implementations may be when the concentration of the reinforcing material does not vary during the entire proppant stage; monotonically increases during the proppant stage; or monotonically decreases during the proppant stage.

Curable or partially curable, resin-coated proppant can be used as reinforcing and consolidating material to form proppant clusters. The selection process of the appropriate resin-coated proppant for a particular bottom hole static temperature (BHST), and the particular fracturing fluid are well known to experienced workers. In addition, organic and/or inorganic fibers can reinforce the proppant cluster. These materials can be used in combination with resin-coated proppants or separately. These fibers can have an inherently adhesive surface, can be chemically or physically modified to have an adhesive coating, or can have an adhesive coating resulting from a layer of non-adhesive substance dissolvable in the fracture by a fluid simultaneously or subsequently passed through the fracture. Fibers made of adhesive material can be used as reinforcing material, coated by a non-adhesive substance that dissolves in the fracturing fluid or another fluid as it is passed through the fracture at the subterranean temperatures. Metallic particles are another embodiment for reinforcing material and can be produced using aluminum, steel optionally containing special additives that inhibit corrosion, and other metals and alloys, and the like. The metallic particles can be shaped to resemble a sphere and measure 0.1-4 mm, for example. In one embodiment, metallic particles can have an elongated shape with a length longer than 2 mm and a diameter of 10 to 200 microns. In another embodiment, plates of organic or inorganic substances, ceramics, metals or metal-based alloys can be used as reinforcing material in the proppant. These plates can be disk or rectangle-shaped and of a length and width such that for all materials the ratio between any two of the three dimensions is greater than 5 to 1.

Alternatively, a high permeability and/or high porosity proppant pack can be suitably employed without detriment. In one embodiment, the permeability of the proppant can provide some limited fracture conductivity in the event the channels are not properly formed or do not fully interconnect. Additionally, under some formation conditions it can be advantageous when using the present method to perform a final tail-in stage of the fracturing treatment involving continuous proppant introduction into the fracturing fluid, with the proppant at this stage consisting essentially of uniform particle size to obtain a zone of continuous-porosity proppant adjacent to the wellbore. If employed, the tail-in stage of the fracturing treatment resembles a conventional fracturing treatment, where a continuous bed of well-sorted conventional proppant is placed in the fracture relatively near to the wellbore. The tail-in stage can involve introduction of both an agent that increases the proppant transport capability of the treatment fluid and/or an agent that acts as a reinforcing material. The tail-in stage is distinguished from the second stage by the continuous placement of a well-sorted proppant, that is, a proppant with an essentially uniform particle size. The proppant strength is sufficient to prevent its cracking (crumbling) when subjected to stresses that occur at fracture closure. The role of the proppant at this tail stage is to prevent fracture closure and, therefore, to provide good fracture conductivity in proximity to the wellbore.

In a second embodiment, after the fracture is induced, proppant and channelant can be injected with the second treatment fluid into the fracture as a slurry or suspension of particles in the fracturing fluid during what is referred to herein as the "proppant stage." In the proppant stage, proppant and optional channelant can be injected in one or more segregated substages alternated between a "proppant substage" and a "channelant substage," and/or as a mixture of channelant and proppant in one or more substages referred to herein as a "mixed substage." Further, the proppant, channelant and/or mixed substages can be separated by one or more optional "carrier substages", which are substantially free of proppant and channelant and can also be substantially free of other particles. The pad stage is followed with a sequence of proppant-laden and proppant-free stages to create the network of the open channels inside the fracture. The fluid used in the proppant-laden and proppant-free stages can be of the same nature and be crosslinked to facilitate the proppant transport. It can also be of the different nature: crosslinked in proppant-laden stages and linear, crosslinked or energized/foamed in proppant-free stages. The proppant-free stage can be of the same type as the first treatment fluid i.e. foamed or energized fluid.

The proppant-rich phase made of high solid content slurry or proppant laden phase stage includes a slurry with a particulate blend made of proppant; the particulate blend comprising at least a first amount of particulates having a first average particle size between about 100 and 5000 µm and at least a second amount of particulates having a second average particle size between about three and twenty times smaller than the first average particle size. In one embodiment, the slurry comprises particulate materials with defined particles size distribution as described above. According to a further embodiment, the slurry may contain, as previously, a binding agent such as resins and cement that can be activated downhole to bind all the individual components in the slurry to form a strong pillar.

The durations of the proppant-laden and proppant-free stages, as well as the concentration of proppant are selected based on the geomechanical properties of the formation and desired fracture geometry. The volumes of the particle-laden and particle-free stages may be the same or different and may vary from 1 bbl to 30 bbl.

As a result, the proppant does not completely fill the fracture. Rather, spaced proppant clusters form as pillars with proppant-spacing channelant material initially filling the channels between them, through which, upon subsequent removal of the channelant, formation fluids pass. The volumes of proppant, channelant and carrier sub-stages as pumped can be different. That is, the volume of the channelant and any carrier substages can be larger or smaller than the volume of the proppant and/or any mixed substages. Furthermore, the volumes and order of injection of these substages can change over the duration of the proppant stage. That is, proppant substages pumped early in the treatment can be of a smaller volume then a proppant substage pumped later in the treatment. The relative volume of the substages can be selected by the engineer based on how much of the surface area of the fracture it is desired to be supported by the clusters of proppant, and how much of the fracture area is desired as open channels through which formation fluids are free to flow.

Suitable proppants are those described above. As well, reinforcing and/or consolidating material can be introduced into the fracture fluid to increase the strength of the proppant clusters formed and prevent their collapse during fracture closure. Typically the reinforcement material can be added to the proppant substage and/or the mixed substage, but could also be introduced additionally or alternatively in the channelant substage and/or the carrier substage, or in other ways. For example, the reinforcement material can be a fiber that serves to reinforce the proppant clusters, but can be removed as or with the channelant from the proppant-lean regions. It can also be suitable in some applications of the present method to introduce the reinforcing material in a continuous or semi-continuous fashion throughout the proppant stage, during a plurality of adjacent carrier, channelant, mixed and proppant substages. For example, the reinforcing material deposited in the channelant regions in the fracture can be removed with the channelant as described below.

The choice of channelant can depend on the mode of channelant segregation and placement in the fracture, as well as the mode of channelant removal and channel formation. In its simplest form, the channelant can be a solid particulate that can be maintained in its solid form during injection and fracture closure, and readily dissolved or degraded for removal. Materials that can be used can be organic, inorganic, glass, ceramic, nylon, carbon, metallic, and so on. Suitable materials can include water- or hydrocarbon-soluble solids such as, for example, salt, calcium carbonate, wax, or the like. Polymers can be used in another embodiment, including polymers such as, polylactic acid (PLA), polyglycolic acid (PGA), polyol, polyethylene terephthalate (PET), polysaccharide, wax, salt, calcium carbonate, benzoic acid, naphthalene based materials, magnesium oxide, sodium bicarbonate, soluble resins, sodium chloride, calcium chloride, ammonium sulfate, and the like, and so on, or any combinations thereof. As used herein, "polymers" includes both homopolymers and copolymers of the indicated monomer with one or more comonomers, including graft, block and random copolymers. The polymers can be linear, branched, star, crosslinked, derivitized, and so on, as desired. The channelant can be selected to have a size and shape similar or dissimilar to the size and shape of the proppant particles as needed to facilitate segregation from the proppant. Also, chanellant can be taken into account for the PVF maximization. And the chanellant can be embodied as a third amount of particulates having a third average particle size that is smaller than the second average particle size, or even as the fourth or fifth amount of particles as disclosed above. Channelant particle shapes can include, for example, spheres, rods, platelets, ribbons, and the like and combinations thereof. In some applications, bundles of fibers, or fibrous or deformable materials, can be used. These fibers can additionally or alternatively form a three-dimensional network, reinforcing the proppant and limiting its flowback.

For example, the separation of injected proppant blend and channelant as introduced and placed in the fracture can be induced by differences (or similarities) in size, density or shape of the two materials. The specific gravities and the volume concentrations of proppant blend and channelant can be tailored to minimize mixing and homogenization during placement. Properly sizing the channelant or adding various weighting agents to the channelant-rich fluid can facilitate segregation at the appropriate time and location.

Either the proppant or the proppant-spacing particles can also be made to be "sticky", so particles of similar material adhere to one another, helping ensure heterogeneity between the two dissimilar materials. Proppant particles can be selected that adhere to other proppant particles as discussed above and to be repelled by or repel the channelant particles. Alternatively, or additionally, channelant particles can be selected that are self-adherent and non-adherent to the proppant. The channelant can, for example, include a self-adherent coating. Another technique to encourage separation of the two materials is selecting proppant and channelant with inherent hydroaffinity differences, or creating surface hydroaffinity differences by treating either the proppant or the channelant with hydrophobic or hydrophilic coatings.

The presence of the channelant in the fracturing fluid in the proppant stage, e.g. in a mixed substage or in a segregated channelant substage, can have the benefit of increasing the proppant transport capability. In other words, the channelant can reduce the settling rate of proppant in the fracture treatment fluid. The channelant can in an embodiment be a material with elongated particles having a length that much exceeds a diameter. This material can affect the rheological properties and suppress convection in the fluid, which can result in a decrease of the proppant settling rate in the fracture fluid and maintain segregation of the proppant from proppant lean regions. The channelant can be capable of decomposing in the water-based fracturing fluid or in the downhole fluid, such as fibers made on the basis of polylactic acid (PLA), polyglycolic acid (PGA), polyvinyl alcohol (PVOH), and others. The fibers can be made of or coated by a material that becomes adhesive at subterranean formation temperatures. They can be made of adhesive material coated by a non-adhesive substance that dissolves in the fracturing fluid or another fluid as it is passed through the fracture. The fibers used in one embodiment can be up to 2 mm long with a diameter of 10-200 microns, in accordance with the main condition that the ratio between any two of the three dimensions be greater than 5 to 1. In another embodiment, the fibers can have a length greater than 1 mm, such as, for example, 1-30 mm, 2-25 mm or 3-18 mm, e.g. about 6 mm; and they can have a diameter of 5-100 microns and/or a denier of about 0.1-20, preferably about 0.15-6. These fibers are desired to facilitate proppant carrying capability of the treatment fluid with reduced levels of fluid viscosifying polymers or surfactants. Fiber cross-sections need not be circular and fibers need not be straight. If fibrillated fibers are used, the diameters of the individual fibrils can be much smaller than the aforementioned fiber diameters.

The concentration of the channelant in the second treatment fluid can conveniently be such that the channelant compressed between the proppant islands by fracture closure has a packed volume to fill the spaces between the packed proppant islands with similar stress in both the proppant and channelant. In other words, the channelant fill serves to hold the proppant islands in place and inhibit lateral expansion that would otherwise reduce the ultimate height of the proppant pillar. The weight concentration of the fibrous channelant material in the fracturing fluid can be from 0.1 to 10 percent in one embodiment. The concentration of the solid channelant material in the treatment fluid in another embodiment is typically from about 0.6 g/L (about 5 ppt) to about 9.6 g/L (about 80 ppt).

In some embodiments, a first type of fiber additive can provide reinforcement and consolidation of the proppant. This fiber type can include, for example, glass, ceramics, carbon and carbon-based compounds, metals and metallic alloys, and the like and combinations thereof, as a material that is packed in the proppant to strengthen the proppant pillars. And in other applications, a second type of fiber can be used that inhibits settling of the proppant in the treatment fluid. The second fiber type can include, for example, polylactic acid, polyglycolic acid, polyethylterephthalate (PET), polyol, and the like and combinations thereof, as a material that inhibits settling or dispersion of the proppant in the treatment fluid and serves as a primary removable fill material in the spaces between the pillars. Yet other applications include a mixture of the first and second fiber types, the first fiber type providing reinforcement and consolidation of the proppant and the second fiber type inhibiting settling of the proppant in the treatment fluid.

The fibers can be hydrophilic or hydrophobic in nature. Hydrophilic fibers are preferred in one embodiment. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like.

In an embodiment, the solid channelant material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. Preferred examples are polyglycolic acid or PGA, and polylactic acid or PLA. These materials function as solid-acid precursors, and upon dissolution in the fracture, can form acid species which can have secondary functions in the fracture.

If desired, a pH control agent can be used in the second treatment fluid, especially where a solid acid precursor is present and one or more of the other treatment fluids is pH-sensitive. The pH control agent can be selected from amines and alkaline earth, ammonium and alkali metal salts of sesquicarbonates, carbonates, oxalates, hydroxides, oxides, bicarbonates, and organic carboxylates, for example sodium sesquicarbonate, triethanolamine, or tetraethylenepentamine.

For example, the channelant can function as an acid breaker for a viscosifying agent, where the channelant is selected from a solid that contains an acid and that hydrolyzes to release an acid, a solid that hydrolyzes to release an acid, and mixtures of such materials. The solid can be present in particles sufficiently small that they at least partially enter pores of the formation, and/or sufficiently large that they remain in the fracture in the spaces between the proppant pillars. The treatment fluid can also contain a pH control agent present in an amount sufficient to neutralize any acid present in the solid material before the injection and to neutralize any acid generated by the solid material during the injection, so that the acid breaker is not available to break the fluid during the injection. When the injection is stopped, the solid is allowed to release acid in excess of the amount that can be neutralized by any pH control agent, thereby breaking the viscous fluid. Optionally, the viscosifying agent in this embodiment is a viscoelastic surfactant system. Optionally, the solid material is of a size that forms an internal filter cake in the pores of the formation. Optionally, the solid material is of a size that does not block the flow of fluid in the pores of the formation. The solid material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. One example is polyglycolic acid. The pH control agent is selected from amines and alkaline earth, ammonium and alkali metal salts of sesquicarbonates, carbonates, oxalates, hydroxides, oxides, bicarbonates, and organic carboxylates, for example sodium sesquicarbonate, triethanolamine, or tetraethylenepentamine.

Suitable solid acids for use in viscoelastic surfactant (VES) fluid systems include substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Other materials suitable for use in VES fluid systems are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference. Suitable solid acids are also described in U.S. Patent Application Publication Nos. 2003/002195 and 2004/0152601, both of which are hereby incorporated by reference and are assigned to the assignee of the present application.

Excellent solid acid components for VES systems are solid cyclic dimers, or solid polymers, of certain organic acids, that hydrolyze under known and controllable conditions of temperature, time and pH to form organic acids. One example, a suitable solid acid is the solid cyclic dimer of lactic acid known as "lactide", which has a melting point of 95 to 125° C. depending upon the optical activity. Another is a polymer of lactic acid, sometimes called a polylactic acid or "PLA", or a polylactate, or a polylactide. Another example is the solid cyclic dimer of gylycolic acid known as "glycolide", which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters. The as-received materials can contain some free acid and some solvent, typically water. Natureworks L.L.C., Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™ PLA. The PLA's currently available from Cargill Dow have molecular weights of up to about 100,000, although any polylactide (made by any process by any manufacturer) and any molecular weight material of any degree of crystallinity can be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed, among other factors, by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers of PGA and PLA can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze; it is to be understood that the terms hydrolyze or hydrolysis, etc., are intended to include dissolution.

The solid acids can be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acids by any means can facilitate segregation from hydrophilic proppant and can delay the hydrolysis for injection and fracture. Note that coating here can refer to encapsulation or simply to changing the surface by chemical reaction or by forming or adding a thin film of another material. Another suitable method of delaying the hydrolysis of the solid acid, and the release of acid, is to suspend the solid acid, optionally with a hydrophobic coating, in an oil or in the oil phase of an emulsion. The hydrolysis and acid release do not occur until water contacts the solid acid.

The VES self-destructs in situ, that is, in the location where it is placed. That location can be part of a suspension in a treatment fluid in the wellbore, in perforations, in a gravel pack, or in a fracture; or as a component of a filter cake on the walls of a wellbore or of a fracture; or in the pores of a formation itself. The VES can be used in formations of any lithology but are used most commonly in carbonates or sandstones. A particular advantage of these materials is that the solid acid precursors and the generated acids are non-toxic and are biodegradable. The solid acids are often used as self-dissolving sutures in medical practice, for example.

A polyol is a polyhydric alcohol, i.e., one containing three or more hydroxyl groups. One embodiment of a polyol useful as a channelant is a polymeric polyol solubilizable upon heating, desalination or a combination thereof, and which consists essentially of hydroxyl-substituted carbon atoms, in a polymer chain, spaced from adjacent hydroxyl-substituted carbon atoms by at least one carbon atom in the polymer chain. In other words, the useful polyols are preferably essentially free of adjacent hydroxyl substituents. In one embodiment, the polyol has a weight average molecular weight greater than 5000 up to 500,000 or more, and from 10,000 to 200,000 in another embodiment. The polyol can if desired be hydrophobically modified to further inhibit or delay solubilization, e.g. by including hydrocarbyl substituents such as alkyl, aryl, alkaryl or aralkyl moieties and/or side chains having from 2 to 30 carbon atoms. The polyol can also be modified to include carboxylic acid, thiol, paraffin, silane, sulfuric acid, acetoacetylate, polyethylene oxide, or quaternary amine or other cationic monomers. Such modifications have several affects on the properties of the polyol; affects on solubility, sensitivity to salinity, pH, and crosslinking functionalities (e.g. hydroxyl groups and silanol groups which are chelates that can crosslink with common crosslinkers) are of most interest to the present invention. All of said modifications are commercially available products.

In one embodiment, the polyol is a substituted or unsubstituted polyvinyl alcohol that can be prepared by at least partial hydrolysis of a precursor polyvinyl compound having ester substituents, such as, for example, polyvinyl acetate, polyvinyl propanoate, polyvinyl butanoate, polyvinyl pentanoate, polyvinyl hexanoate, polyvinyl 2-methyl butanoate, polyvinyl 3-ethylpentanoate, polyvinyl 3-ethylhexanoate, and the like, and combinations thereof. When the polyol comprises polyvinyl alcohol prepared by at least partial hydrolysis of polyvinyl acetate, the polyol is not generally soluble in salt water, as discussed in more detail below, and further, the polyol is commercially available in the form of partially crystalline fibers that have a relatively sharp trigger temperature below which the fibers are not soluble in water and above which they readily dissolve.

To facilitate a better understanding, the following example of embodiments is given. In no way should the following example be read to limit, or define, the scope.

Example

In the environment where high viscosity crosslinked fluids are not used, e.g. slick water market, the narrow fracture width created with low viscosity fluid (slick water) cannot allow the high concentration of proppant to be transported into the fracture.

Figure 3:
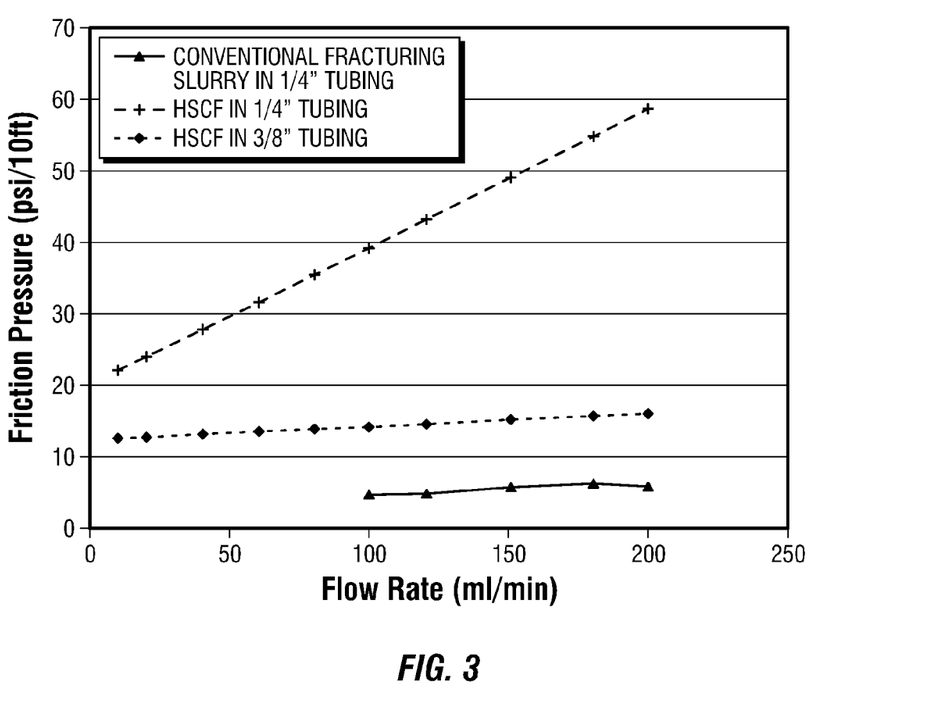
FIG. 3 is a graph comparing friction pressure of high solid content fluid and conventional slurry fluid.

It has been demonstrated that for high solid content fluid, although the apparent viscosities of high solid content fluid are not very high, usually in a few hundreds cPs, it has a unique friction pressure behavior (due to the fluid formulation) when flowing in narrow gap/tubing. Shown in FIG. 3 is a comparison of friction pressures of high solid content fluid (HSCF) with conventional fracturing slurry. When flowing in a ¼ inch tubing, the high solid content fluid friction pressure is much higher than that of the conventional frac slurry. When flowing the high solid content fluid in a wider tubing, ⅜ inch, the friction pressure drops dramatically. This indicates that the high solid content fluid high friction behavior is mainly in the narrow gap, such as in a hydraulic fracture. The high friction pressure in narrow gap will create large net pressure for the fluid to create fracture width, but not so high friction pressure in tubing will allow less impact when pumped through tubing/casing. With the ability of creating wide fracture width using high solid content fluid, it makes it possible to have high solid concentration slugs be pumped into the fracture to serve as strong pillars. Fiber laden clean fluid can be used as the spacer fluid to create channels since it will have less tendency to allow the high solid content fluid to mix with the clean fluid which can cause the interface to be unstable.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of placing proppant into a fracture formed in a subterranean formation from a wellbore, the method comprising:
    injecting through the wellbore a first treatment fluid to initiate the fracture in the subterranean formation;
    injecting through the wellbore a second treatment fluid comprising a sequence of two separate stages, a first stage comprising a particulate blend high solid content slurry comprising proppant; the particulate blend high solid content slurry comprising at least a first amount of particulates having a first average particle size—between about 100 and 5000 μm and at least a second amount of particulates having a second average particle size between about three and twenty times smaller than the first average particle size; and a second stage comprising a proppant-free phase;
    wherein injection of the second treatment fluid is done by alternating stages of the first stage comprising the proppant-rich phase comprising the particulate blend high solid content slurry and the second stage comprising the proppant-free phase;
    forming with the particulate blend high solid content slurry a plurality of proppant-rich clusters spaced apart by proppant-free regions; and
    forming open channels in the proppant-free regions, wherein the particulate blend high solid content slurry has a packed volume fraction which exceeds 0.74.

2. The method of claim 1, wherein the first treatment fluid and the proppant-free phase are substantially free of macroscopic particles.

3. The method of claim 1, wherein the first stage comprising the proppant rich phase and the second stage comprising the proppant-free phase are separated by injection of a fiber spacer.

4. The method of claim 1, wherein the second treatment fluid further comprises channelant in the second stage comprising the proppant-free phase, and forming pillars from the proppant clusters, wherein the clusters are spaced apart by the channelant in the proppant-free regions.

5. The method of claim 4, wherein the forming of the open channels comprises removing the channelant around the pillars for fluid flow from the subterranean formation through the fracture toward the wellbore.

6. The method of claim 4, wherein the channelant comprises solid particles.

7. The method of claim 4 comprising segregating the proppant and channelant during injection of the second treatment fluid.

8. The method of claim 4, wherein the first stage comprising the proppant-rich phase further comprises the channelant.

9. The method of claim 4, wherein the channelant comprises particles selected from the group consisting of polylactic acid (PLA), polyglycolic acid (PGA), polyol, salt, polysaccharide, wax, calcium carbonate, benzoic acid, naphthalene based materials, magnesium oxide, sodium bicarbonate, soluble resins, polyvinyl alcohol (PVOH) and combinations thereof.

10. The method of claim 1, wherein the first treatment fluid comprises a first carrier fluid comprising water and a viscosifying agent or a friction reducer.

11. The method of claim 1, wherein the first treatment fluid comprises a gas component.

12. The method of claim 11, wherein said gas component comprises a gas selected from the group consisting of carbon dioxide, supercritical carbon dioxide, nitrogen, air and any mixtures thereof.

13. The method of claim 11, wherein said gas component comprises from about 10% to about 90% of a total first fluid volume percent.

14. The method of claim 1, wherein the second treatment fluid comprises a second carrier fluid comprising water and a viscosifying agent or a friction reducer.

15. The method of claim 1, wherein the particulate blend comprises a degradable material.

16. The method of claim 1, wherein the particulate blend comprises a binding agent.

17. The method of claim 16, wherein the binding agent is selected from the group consisting of resin, cement, sticky fiber, polymer that exhibit sticky properties at high temperature and any mixtures thereof.

18. The method of claim 1, wherein the particulate blend comprises fiber.

19. The method of claim 18, wherein the fibers are selected from the group consisting of glass, ceramics, carbon and carbon-based compounds, metals and metallic alloys, polylactic acid, polyglycolic acid, polyethylene terephthalate, polyol and combinations thereof.

20. The method of claim 1, further comprising producing fluids from the subterranean formation through the open channels and the wellbore.

21. The method of claim 1, wherein the packed volume fraction of the particulate blend high solid content slurry exceeds 0.74, and wherein a sum of all particulates in the particulate blend high solid content slurry exceeds 1.92 kg per liter of carrier fluid (16 pounds per gallon).

22. The method of claim 21, wherein the packed volume fraction of the particulate blend high solid content slurry exceeds 0.84.

23. The method of claim 1, wherein the subterranean formation comprises at least in part shale rock.

24. A method of placing a proppant pack into a fracture formed in a subterranean formation, the method comprising:
injecting through the wellbore a first treatment fluid substantially free of macroscopic particles to initiate the fracture in the subterranean formation;
then injecting through the wellbore a second treatment fluid comprising a particulate blend high solid content slurry comprising proppant and channelant; the particulate blend high solid content slurry comprising at least a first amount of particulates having a first average particle size between about 100 and 5000 µm and at least a second amount of particulates having a second average particle size between about three and twenty times smaller than the first average particle size; such that a packed volume fraction of the particulate blend high solid content slurry exceeds 0.74;
then injecting through the wellbore a plurality of additional stages comprising the first treatment fluid alternated with the second treatment fluid; and
forming with the particulate blend high solid content slurry a plurality of proppant clusters forming pillars spaced apart by the channelant.

25. The method of claim 24, further comprising removing the channelant to form further open channels around the pillars for fluid flow from the subterranean formation through the fracture toward the wellbore.

26. The method of claim 25, wherein the additional alternating stages comprising the first treatment fluid alternated with the second treatment fluid are separated by injection of a fiber spacer.

27. The method of claim 24, wherein the packed volume fraction of the particulate blend high solid content slurry exceeds 0.84 and wherein a sum of all particulates in the high solid content slurry exceeds 1.92 kg per liter of carrier fluid (16 pounds per gallon).

* * * * *